United States Patent
Chang et al.

(10) Patent No.: US 6,667,789 B2
(45) Date of Patent: Dec. 23, 2003

(54) MULTI-DOMAIN VERTICALLY ALIGNED LIQUID CRYSTAL DISPLAY

(75) Inventors: Wei-Chih Chang, Hsinchu Hsien (TW); Dai-Liang Ting, Hsinchu (TW)

(73) Assignee: Unipac Optoelectronics Corp., Hsinchu (TW)

(*) Notice: Subject to any disclaimer, the term of this patent is extended or adjusted under 35 U.S.C. 154(b) by 284 days.

(21) Appl. No.: 09/849,134

(22) Filed: May 4, 2001

(65) Prior Publication Data

US 2002/0163613 A1 Nov. 7, 2002

(51) Int. Cl.[7] .................................. G02F 1/1337
(52) U.S. Cl. .................... 349/129; 349/130; 349/84
(58) Field of Search ........................ 349/129, 130, 349/122, 123, 138, 84

(56) References Cited

U.S. PATENT DOCUMENTS

| | | | |
|---|---|---|---|
| 6,188,457 B1 * | 2/2001 | Liu | 349/124 |
| 6,424,396 B1 * | 7/2002 | Kim et al. | 349/130 |
| 6,424,397 B1 * | 7/2002 | Kuo | 349/139 |

* cited by examiner

Primary Examiner—Robert H. Kim
Assistant Examiner—David Chung
(74) Attorney, Agent, or Firm—J.C. Patents

(57) ABSTRACT

A multi-domain vertically aligned liquid crystal display. The multi-domain vertically aligned liquid crystal display has a lower board, an upper board and a liquid crystal. The lower substrate board has a plurality of slits therein. There is a bent protrusion structure on the surface between the slits. The bent protrusion structure has two pairs of surfaces symmetrical about a vertical mid-line. The pair of surfaces next to the slits makes a first angle with the horizontal while the other pair of surfaces next to the mid-line makes a second angle with the horizontal. A thin film transistor is embedded in the lower substrate board underneath the bent protrusion structures for providing an electric field. An indium-tin-oxide electrode is formed on top of each bent protrusion structure. The upper substrate board is mounted on top and parallel to the lower substrate board. The liquid crystal fills the space between the upper and the lower substrate board. The long axes of most of the liquid crystal molecules inside liquid crystal are perpendicular to the upper substrate board. The long axes of most liquid crystal molecules near the slits are perpendicular to the electric field. The long axes of most liquid crystal molecules above the bent protrusion structure deviate from the direction of the electric field by varying degrees.

12 Claims, 2 Drawing Sheets

MULTI-DOMAIN VERTICALLY ALIGNED LIQUID CRYSTAL DISPLAY

BACKGROUND OF THE INVENTION

1. Field of Invention

The present invention relates to a liquid crystal display. More particularly, the present invention relates to a multi-domain vertically aligned (MVA) liquid crystal display.

2. Description of Related Art

A conventional multi-domain vertically aligned liquid crystal display consists of an upper substrate board and a lower substrate board facing each other and parallel to each other. A transparent electrode is formed on the upper surface of the lower substrate board while another electrode is formed on the lower surface of the upper substrate board. A lower polarizing panel is attached to the underside of the lower substrate board while an upper polarizing panel is attached to top of the upper substrate board. The combination of the upper and lower polar panel permits only linearly polarized light in the orthogonal axis to pass through. A plurality of club-shaped liquid crystal molecules fills the space between the upper and the lower substrate board. The liquid crystal molecules are aligned in a direction perpendicular to the substrate boards.

When no external voltage is applied to the upper and lower electrodes, a beam of light entering the lower polarizing panel is linearly polarized. Since the long axis of the liquid crystal molecules is parallel to the direction of propagation of the light, there are no multiple twistings of the linearly polarized light. In other words, the linearly polarized light is unable to pass through the upper polarizing panel and so the area is dark. When an electric potential is applied between the upper and the lower electrodes, an electric field perpendicular to the substrate boards is produced. If the potential is greater than a threshold value, the electric field may be strong enough to rotate the liquid crystal molecules. Ultimately, the long axis of the liquid crystal molecules rotates to a fixed angle relative to the direction of the applied electric field. Hence, the linearly polarized light, subjected to the multiple twisting of rotated liquid crystal molecules, emerges as an elliptically polarized beam of light. Consequently, a portion of the incoming light is able to penetrate the upper polarizing panel to become a bright region.

In the multi-domain vertically aligned liquid crystal display, the long axes of the liquid crystal molecules are parallel to the electric field when the electric field is first established. Thus, their rotation rate is relatively slow at first. After the liquid crystal molecules have rotated for some time so that the long axes of the liquid crystal molecules are closer to the perpendicular direction of the electric field, their rotation rate increases considerably. To reduce the response time of the liquid crystal molecules and increase sensitivity, pre-tilt control is normally incorporated into a liquid crystal display. In other words, the long axes of the liquid crystal molecules are purposely positioned so that they are tilted at an angle relative to the direction of the applied electric field. In general, pre-tilting of molecules is achieved by forming slits or protrusions or a combination of the two on the color filter (CF) and the thin film transistor (TFT). By the introduction of these slits and protrusions, the long axes of a portion of the liquid crystal molecules are aligned tilted at an angle and some of the electric field lines are twisted.

FIG. 1 is a schematic cross-sectional view of a conventional multi-domain vertically aligned liquid crystal display having slits in the lower substrate board. As shown in FIG. 1, the lower substrate board 100 has a plurality of slits 106 therein. Most of the liquid crystal molecules 104 have their long axes aligned in a direction perpendicular to the upper and the lower substrate board. However, the long axes of those liquid crystal molecules 104 close to the slits 106 are tilted at an angle relative to the lower substrate board 100. When an external voltage of 7 V is applied to the electrodes, transparency rating of the liquid crystal is about 46% while the response time is about 20 msec. When an external voltage of 5 V is applied, the transparency rating of the liquid crystal decreases to about 43% while the response time increases to about 43 msec. Finally, if an external voltage of 3 V is applied, the transparency rating of the liquid crystal decreases considerably to about 15% while the response time increases considerably to about 179 msec.

FIG. 2 is a schematic cross-sectional view of a conventional multi-domain vertically aligned liquid crystal display having alternately positioned slits in both the upper and the lower substrate board. As shown in FIG. 2, both the upper substrate board 102 and the lower substrate board 100 contains a plurality of slits 106. Furthermore, the slits 106 in the upper substrate board 102 are alternately positioned with respect to the slits 106 in the lower substrate board 100. Most of the liquid crystal molecules 104 have their long axes aligned in a direction perpendicular to the upper and the lower substrate board. However, the long axes of those liquid crystal molecules 104 close to the slits 106 are tilted at an angle relative to the upper substrate board 102 and the lower substrate board 100. When an external voltage of 7 V is applied to the electrodes, transparency rating of the liquid crystal is about 44.15% while the response time is about 13 msec. When an external voltage of 5 V is applied, the transparency rating of the liquid crystal decreases to about 41.11% while the response time increases to about 27 msec. Finally, if an external voltage of 3 V is applied, the transparency rating of the liquid crystal decreases considerably to about 15.20% while the response time increases considerably to about 129 msec.

Accordingly, the additional slits in the upper substrate board 102 are able to reduce the response time of the liquid crystal by about one-third with little effect on the transparency ratings. However, the addition of slits in the upper substrate board 102 increases the number of processing steps and hence production cost.

FIG. 3 is a schematic cross-sectional view of a conventional multi-domain vertically aligned liquid crystal display having bumps on the lower substrate board. As shown in FIG. 3, the lower substrate board 100 has a plurality of bumps. An indium tin oxide (ITO) layer is formed over the bump to form a trapezoidal transparent electrode 108. In general, the long axes of the liquid crystal molecules 110 near the ITO electrode 108 are perpendicular to the surface of the ITO electrode 108. Moreover, the long axes of the molecules 104 also align with the electric field 112. Consequently, this portion of the liquid crystal molecules 104 cannot achieve the desired pre-tilt effect. Although the alignment of long axes of the liquid crystal molecules 104 differs more from the alignment of electric field 112 when the molecules are further away from the ITO electrode 108, the difference is only minimal. Hence, the pre-tilt effect resulting from this design is small.

SUMMARY OF THE INVENTION

Accordingly, one object of the present invention is to provide a multi-domain vertically aligned liquid crystal display having a high transparency rating and sensitivity.

A second object of this invention is to provide a multi-domain vertically aligned liquid crystal display that demands special processing of the electrode on the lower substrate board using conventional methods only.

To achieve these and other advantages and in accordance with the purpose of the invention, as embodied and broadly described herein, the invention provides a multi-domain vertically aligned liquid crystal display. The multi-domain vertically aligned liquid crystal display includes a lower board, an upper board and a liquid crystal. The lower substrate board contains a plurality of slits therein. There is a bent protrusion structure on the surface between the slits. The bent protrusion structure has two pairs of symmetrical surfaces. The pair of surfaces next to the slits makes a first angle with the horizontal while the other pair of surfaces next to the mid-line makes a second angle with the horizontal. A thin film transistor is embedded in the lower substrate board underneath the bent protrusion structures for providing an electric field. An indium-tin-oxide electrode is formed on top of each bent protrusion structure. The upper substrate board is mounted on top and in parallel to the lower substrate board. The liquid crystal fills the space between the upper and the lower substrate board. The long axes of most of the liquid crystal molecules inside liquid crystal are perpendicular to the upper substrate board. The long axes of most liquid crystal molecules near the slits are perpendicular to the electric field. The long axes of most liquid crystal molecules above the bent protrusion structure deviate from the direction of the electric field by varying degrees.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
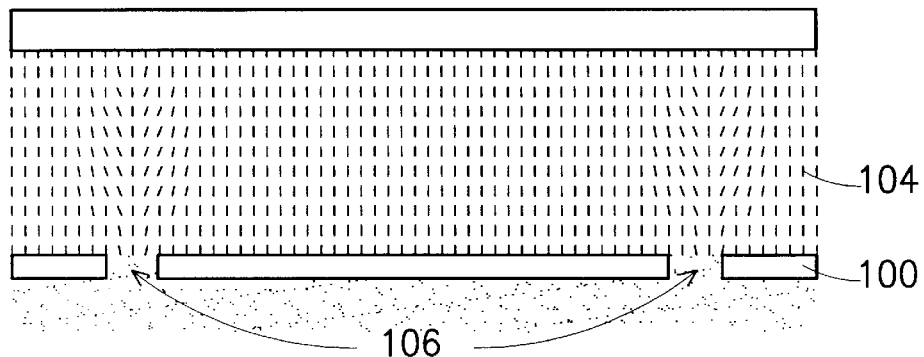
FIG. 1 is a schematic cross-sectional view of a conventional multi-domain vertically aligned liquid crystal display having slits in the lower substrate board.

Reference will now be made in detail to the present preferred embodiments of the invention, examples of which are illustrated in the accompanying drawings. Wherever possible, the same reference numbers are used in the drawings and the description to refer to the same or like parts.

One of the major innovations in this invention is the provision of slits and ITO electrodes over bent protrusion structures on the lower substrate board of a multi-domain vertically aligned liquid crystal display. Due to the larger bending near the edge of the ITO electrodes, a lateral field is formed and the long axes of the liquid crystal molecules are more out of alignment with the electric field. In fact, the long axes of the molecules are almost perpendicular to the electric field. On the other hand, due to the smaller bending near the mid-portion of the ITO electrodes, the long axes of the liquid crystal molecules above the ITO electrodes are only slightly out of alignment with the electric field.

Figure 4:
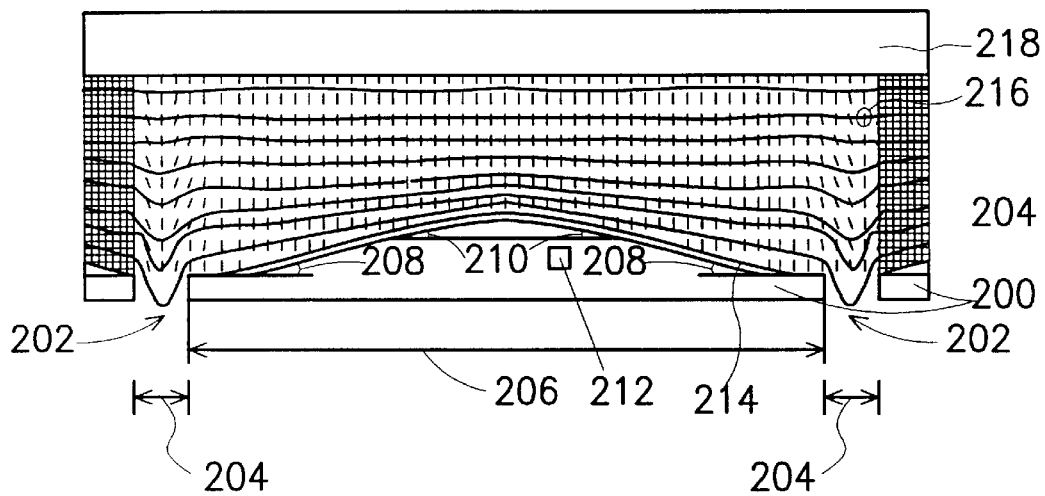
FIG. 4 is a schematic cross-section view of a multi-domain vertically aligned liquid crystal display having slits and bent protrusion structures on the lower substrate board according to this invention.

FIG. 4 is a schematic cross-section view of a multi-domain vertically aligned liquid crystal display having slits and bent protrusion structures on the lower substrate board according to this invention. The multi-domain vertically aligned liquid crystal display comprises a lower substrate board 200, an upper substrate board 216 and a liquid crystal containing a plurality of liquid crystal molecules 218. The lower substrate board 200 has a plurality of slits 202 therein, the slits preferably having a width 204 of about 8 $\mu$m. There is a bent protrusion structure between every pair of slits 202 on the upper surface of the lower substrate board 200. Each bent protrusion structure preferably has a width 206 of about 60 $\mu$m and contains two pairs of surfaces symmetrically positioned about a vertical mid-line of the bent protrusion structure. The pair of surfaces closer to the slits makes a first angle 208 with the horizontal while the pair of surfaces closer to the middle makes a second angle 210 with the horizontal. The first angle 208 is preferably about 3.18° and the second angle is preferably about 1.15°. A thin film transistor 212 is formed inside the lower substrate board 200 beneath the bent protrusion structure. An indium-tin-oxide electrode 214 (FIG. 5) is formed over the bent protrusion structure, thereby forming a bent transparent electrode. The upper substrate board 216 is above and parallel to the lower substrate board 200. The liquid crystal fills the space between the upper substrate board 216 and the lower substrate board 200. The long axes of most liquid crystal molecules are aligned in a direction perpendicular to the upper substrate board 216. The long axes of most of the liquid crystal molecules near the slits 202 are aligned in a direction that deviates from the perpendicular of the upper substrate board.

Figure 5:
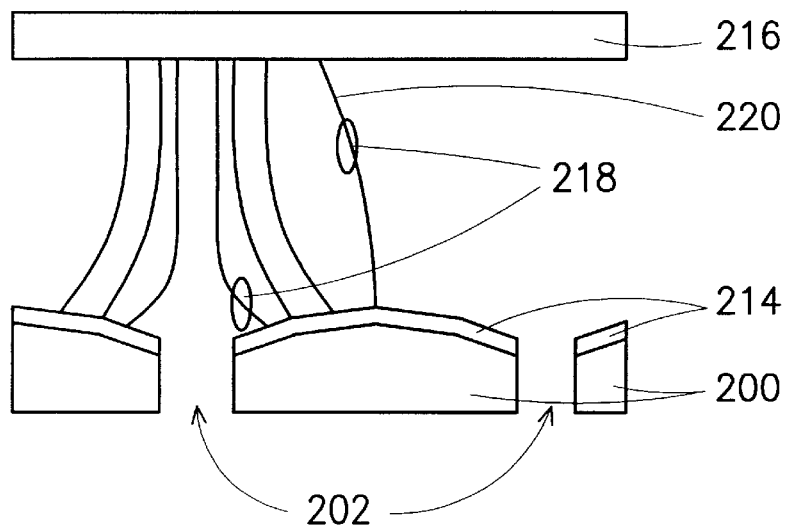
FIG. 5 is a schematic cross-sectional diagram showing the effect of electric field on the liquid crystal molecules for a multi-domain vertically aligned liquid crystal display having the structure shown in FIG. 4.

FIG. 5 is a schematic cross-sectional diagram showing the effect of an electric field on the liquid crystal molecules for a multi-domain vertically aligned liquid crystal display having the structure shown in FIG. 4. As shown in FIG. 5, the electric field 220 close to the indium-tin-oxide (ITO) electrode 214 is perpendicular to the surface of the ITO electrode 214. Since the ITO electrode has a protrusion structure, the alignment of liquid crystal molecules 218 near the slits 202 above the ITO electrode 214 deviates considerably from the electric field 220. For this type of design, the liquid crystal molecules 218 far away from the ITO electrode 214 still maintain a slight deviation of alignment from the electric field 220. Hence, the slits 202 and the bent protrusion structures together can provide the much needed pre-tilting of liquid crystal molecules 218.

When an external voltage of 7 V is applied to the electrodes, transparency rating of the liquid crystal is about 45.70% while the response time is about 13 msec. When an external voltage of 5 V is applied, the transparency rating of the liquid crystal decreases to about 39.26% while the response time increases to about 28 msec. Finally, if an external voltage of 3 V is applied, the transparency rating of the liquid crystal decreases to about 9.0% while the response time increases to about 132 msec.

Figure 2:
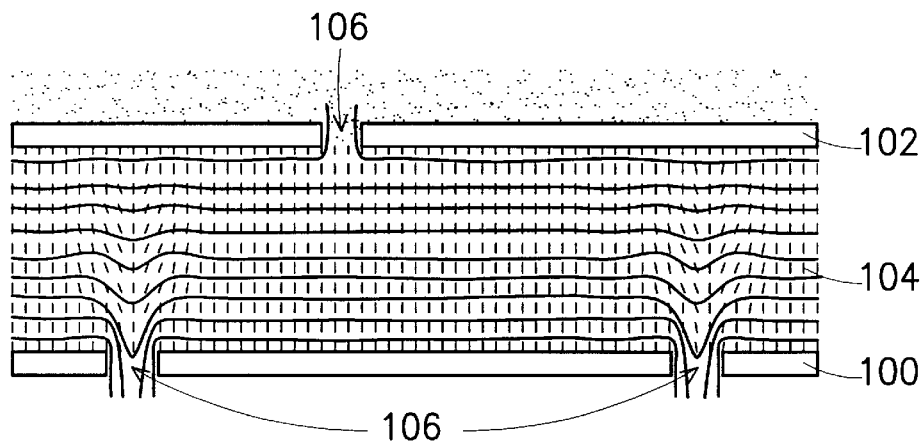
FIG. 2 is a schematic cross-sectional view of a conventional multi-domain vertically aligned liquid crystal display having alternately positioned slits in both the upper and the lower substrate board.
Figure 3:
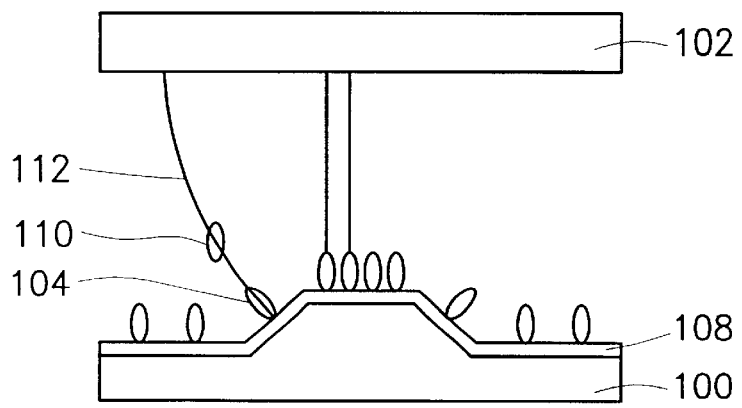
FIG. 3 is a schematic cross-sectional view of a conventional multi-domain vertically aligned liquid crystal display having bumps on the lower substrate board.

Compared with a conventional multi-domain vertically aligned liquid crystal display having alternately positioned slits in the upper and the lower substrate board (shown in FIG. 2), this invention only requires the processing of the lower substrate board to form slits and bent protrusion structures. Both the transparency rating and the response time are very close to the values obtained in a conventional design.

In summary, this invention is able to provide a multi-domain vertically aligned liquid crystal display having a transparency rating and sensitivity similar to a conventional design but requires fabrication of only the lower substrate board.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multi-domain vertically aligned liquid crystal display, comprising:
    a lower substrate board having a plurality of slits and a bent protrusion structure above the lower substrate board between every pair of slits;
    a thin film transistor in the lower substrate board underneath the bent protrusion structure, wherein the thin film transistor provides an electric field;
    a transparent electrode formed on the bent protrusion structure;
    an upper substrate board above and parallel to the lower substrate, wherein the lower surface of the upper substrate board has a transparent electrode thereon; and
    a liquid crystal containing a plurality of liquid crystal molecules, each having a long axis, in the space between the upper and the lower substrate board, wherein the long axes of most liquid crystal molecules are perpendicular to the upper substrate board, the long axes of most liquid crystal molecules in the neighborhood of the slits are perpendicular to the electric field, and the long axes of most liquid crystal molecules above the bent protrusion structure slightly deviate in varying degrees from the direction of the electric field.

2. The liquid crystal display of claim 1, wherein the slit has a width of about 6 to 10 µm.

3. The liquid crystal display of claim 1, wherein the bent protrusion structure has an overall width of about 50 to 70 µm.

4. The liquid crystal display of claim 1, wherein the bent protrusion structure contains two pairs of surfaces symmetric about a vertical mid-line of the bent protrusion structures, wherein a pair of surfaces next to the slits forms a first angle with a horizontal and a pair of surfaces next to the mid-line forms a second angle with the horizontal.

5. The liquid crystal display of claim 4, wherein the first angle of the bent protrusion structure is between about 3.00° and 3.40°.

6. The liquid crystal display of claim 4, wherein the second angle of the bent protrusion structure is between about 1.00° and 1.30°.

7. A multi-domain vertically aligned liquid crystal display, comprising:
    a lower substrate board;
    a plurality of thin film transistors in the lower substrate board for providing an electric field;
    a plurality of bent protrusion structure above the plurality of thin film transistors and the lower substrate board;
    a plurality of slits, each slit being positioned at ends of each bent protrusion structure;
    a transparent electrode over the bent protrusion structure;
    an upper substrate board above and parallel to the lower substrate; and
    a liquid crystal containing a plurality of liquid crystal molecules each having a long axis in the space between the upper and the lower substrate board, wherein the long axes of most liquid crystal molecules are perpendicular to the upper substrate board, the long axes of most liquid crystal molecules in the neighborhood of the slits are perpendicular to the electric field, and the long axes of most liquid crystal molecules above the bent protrusion structure slightly deviate in varying degrees from the direction of the electric field.

8. The liquid crystal display of claim 7, wherein the slit has a width of about 6 to 10 µm.

9. The liquid crystal display of claim 7, wherein the bent protrusion structure has an overall width of about 50 to 70 µm.

10. The liquid crystal display of claim 7, wherein the bent protrusion structure contains two pairs of surfaces symmetric about a vertical mid-line, wherein a pair of surfaces next to the slits forms a first angle with a horizontal and a pair of surfaces next to the mid-line forms a second angle with the horizontal.

11. The liquid crystal display of claim 10, wherein the first angle of the bent protrusion structure is between about 3.00° and 3.40°.

12. The liquid crystal display of claim 10, wherein the second angle of the bent protrusion structure is between about 1.00° and 1.30°.

* * * * *